United States Patent [19]
Charny et al.

[11] Patent Number: 6,072,772
[45] Date of Patent: Jun. 6, 2000

[54] METHOD FOR PROVIDING BANDWIDTH AND DELAY GUARANTEES IN A CROSSBAR SWITCH WITH SPEEDUP

[75] Inventors: Anna Charny, Sudbury; Pattabhiraman Krishna, Marlboro; Naimish Patel, North Andover; Robert J. Simcoe, Westboro, all of Mass.

[73] Assignee: Cabletron Systems, Inc., Rochester, N.H.

[21] Appl. No.: 09/005,738

[22] Filed: Jan. 12, 1998

[51] Int. Cl.[7] ................................................. G01R 31/08
[52] U.S. Cl. ............................................ 370/229; 370/412
[58] Field of Search ................................... 370/229–235, 370/412, 416, 417, 395, 428, 429, 413, 414, 415

[56] References Cited

U.S. PATENT DOCUMENTS

| | | | |
|---|---|---|---|
| 4,823,338 | 4/1989 | Chan et al. | 370/85 |
| 4,845,710 | 7/1989 | Nakamura et al. | 370/110.1 |
| 4,933,937 | 6/1990 | Konishi | 370/85.13 |
| 5,018,133 | 5/1991 | Tsukakoshi et al. | 370/16 |
| 5,138,615 | 8/1992 | Lamport et al. | 370/94.3 |
| 5,237,661 | 8/1993 | Kawamura et al. | 395/250 |
| 5,321,693 | 6/1994 | Perlman | 370/85.13 |
| 5,394,402 | 2/1995 | Ross | 370/94.1 |
| 5,473,599 | 12/1995 | Li et al. | 370/16 |
| 5,594,732 | 1/1997 | Bell et al. | 370/401 |
| 5,617,421 | 4/1997 | Chin et al. | 370/402 |
| 5,621,734 | 4/1997 | Mann et al. | 370/94.1 |
| 5,636,215 | 6/1997 | Kubo et al. | 370/397 |
| 5,734,865 | 3/1998 | Yu | 395/500 |
| 5,768,257 | 6/1998 | Khacherian et al. | 370/229 |
| 5,802,056 | 9/1998 | Amato et al. | 540/360 |
| 5,805,816 | 9/1998 | Pacazo, Jr. et al. | 395/200.53 |
| 5,892,922 | 4/1999 | Lorenz | 395/200.68 |

FOREIGN PATENT DOCUMENTS

| | | | |
|---|---|---|---|
| 0 404 337 | 12/1990 | European Pat. Off. | H04L 12/28 |
| WO 96/08899 | 3/1996 | WIPO | H04L 12/56 |

OTHER PUBLICATIONS

"Draft Standard P802.10/D7" IEEE Standards For Local and Metropolitan Area Networks: Virtual Bridged Local Area Networks, Oct. 3, 1997, XP002103631 Retrieved from Internet: <URL:ftp://p8021: –go__wildcats@8021.hep.net/ 8021/g–drafts/d7>see p. 183—p. 186.

Liu N. H. et al. "A New Packet Scheduling Alogorithm For Input–Buffered Multicast Packet Switches" IEEE Global Telecommunications Conference, Phoenix, Arizona, Nov. 3–8, 1997, vol. 3, Nov. 3, 1997, pp. 1695–1699, XP000737812 Institute of Electrical and Electronics Engineers, see paragraph 1.

Mark B. L. et al.:"Large Capacity Multiclass ATM Core Switch Architecture" ISS '97. World Telecommunications Congress. (International Switching Symposium), Global Network Evolution: Convergence or Collision? Toronto, Sep. 21–26, 1997 vol. 1, Sep. 21, 1997, pp. 417–423 XP0000720547.

(List continued on next page.)

*Primary Examiner*—Huy D. Vu
*Assistant Examiner*—Prenell Jones
*Attorney, Agent, or Firm*—Wolf, Greenfield & Sacks, P.C.

[57] ABSTRACT

An arbitration scheme for providing deterministic bandwidth and delay guarantees in an input-buffered crossbar switch with speedup S is presented. Within the framework of a crossbar architecture having a plurality of input channels and output channels, the arbitration scheme determines the sequence of fixed-size packet (or cell) transmissions between the inputs channels and outputs channels satisfying the constraint that only one cell can leave an input channel and enter an output channel per phase in such a way that the arbitration delay is bounded for each cell awaiting transmission at the input channel. If the fixed-sized packets result from fragmentation of variable size packets, the scheduling and arbitration scheme determines deterministic delay guarantees to the initial variable size packets (re-assembled at the output channel) as well.

10 Claims, 4 Drawing Sheets

OTHER PUBLICATIONS

Chang C–Y et al.: "A Broadband Packet Switch Architecture with Input and Output Queueing" Proceedings of the Global Telecommunications Conference (Globecom), San Francisco, Nov. 28–Dec. 2, 1994, vol. 1, Nov. 28, 1994, pp. 448–452, XP000488590 Institute of Electrical and Electronics Engineers.

Prabhakar B. et al.: "Multicast Scheduling for Input–Queued Switches" IEEE Journal on Selected Areas in Communications, vol. 15, No. 5, Jun. 1, 1997, pp. 855–866, XP000657038 see paragraph 1.

METHOD FOR PROVIDING BANDWIDTH AND DELAY GUARANTEES IN A CROSSBAR SWITCH WITH SPEEDUP

FIELD OF THE INVENTION

The present invention relates generally to variable and fixed size packet switches, and more particularly, to an apparatus and method for scheduling packet inputs through such packet switches.

BACKGROUND OF THE INVENTION

In the field of Integrated Services Networks, the importance of maintaining Quality of Service (QoS) guarantees for individual traffic streams (or flows) is generally recognized. Thus, such capability continues to be the subject of much research and development. Of particular interest for a system providing guaranteed flows are the guarantees associated with bandwidth and delay properties. These guarantees must be provided to all flows abiding to their service contract negotiated at connection setup, even in the presence of other potentially misbehaved flows. Many different methods have been developed to provide such guarantees in non-blocking switch architectures such as output buffered or shared memory switches. Several algorithms providing a wide range of delay guarantees for non-blocking architectures have been disclosed in the literature. See, for example, A. Parekh, "A Generalized Processor Sharing Approach to Flow Control in Integrated Services Networks", MIT, Ph.D dissertation, June 1994; J. Bennett and H. Zhang, "WF2Q—Worst-case Fair Weighted Fair Queueing", Proc. IEEE INFOCOM'96; D. Stiliadis and A. Varma, "Frame-Based Fair Queuing: A New Traffic Scheduling Algorithm for Packet Switch Networks", Proc. IEEE INFOCOM '96; L. Zhang, "A New Architecture for Packet Switched Network Protocols," Massachusetts Institute of Technology, Ph.D Dissertatation, July 1989; A. Charny, "Hierarchical Relative Error Scheduler: An Efficient Traffic Shaper for Packet Switching Networks," Proc. NOSSDAV '97, May 1997, pp. 283–294; and others. Schedulers capable of providing bandwidth and delay guarantees in non-blocking architectures are commonly referred to as "QoS-capable schedulers".

Typically, output-buffered or shared memory architectures require the existence of high-speed memory. For example, an output-buffered switch requires that the speed of memory at each output must be equal to the total speed of all inputs. Unfortunately, the rate of the increase in memory speed available with current technology has not kept pace with the rapid growth in demand for providing large-scale integrated services networks. Because there is a growing demand for large switches with total input capacity of the order of tens and hundreds of Gb/s, building an output buffered switch at this speed has become a daunting task given the present state of technology. Similar issues arise with shared memory switches as well.

As a result, many industrial and research architectures have adopted a more scalable approach, for example, crossbars. Details of such architectures may be had with reference to the following papers: T. Anderson, S. Owicki, J. Saxe, C. Thacker, "High Speed Switch Scheduling for Local Area Networks", Proc. Fifth Internt. Conf. on Architectural Support for Programming Languages and Operating Systems," October 1992, pp. 98–110; and N. McKeown, M. Izzard, A. Mekkittikul, W. Ellersick and M. Horowitz, "The Tiny Tera: A Packet Switch Core." Even given the advances in the art, providing bandwidth and delays in an input-queued crossbar switch remains a significant challenge.

A paper by N. McKeown, V. Anatharam and J. Warland, entitled "Achieving 100% Throughput in an Input-Queued Switch," Proc. IEEE INFOCOM '96, March 1996, pp. 296–302, describes several algorithms based on weighted maximum bipartite matching (defined therein) and capable of providing 100% throughput in an input-buffered switch. Unfortunately, the complexity of these algorithms is viewed as too high to be realistic for high-speed hardware implementations. In addition, the nature of the delay guarantees provided by these algorithms remains largely unknown.

Published research by D. Stiliadis and A. Varma, entitled "Providing Bandwidth Guarantees in an Input-Buffered Crossbar Switch," Proc. IEEE INFOCOM '95, April 1995, pp. 960–968, suggests that bandwidth guarantees in an input buffered crossbar switch may be realized using an algorithm referred to as Weighted Probabilistic Iterative Matching (WPIM), which is essentially a weighted version of the algorithm described in Anderson et al. Although the WPIM algorithm is more suitable for hardware implementations than that described by McKeown et al., it does not appear to provide bandwidth guarantees.

One prior method of providing bandwidth and delay guarantees in an input-buffered crossbar architecture uses statically computed schedule tables (an example of which is described in Anderson et al.); however, there are several significant limitations associated with this approach. First, the computation of schedule tables is extremely complex and time-consuming. Therefore, it can only be performed at connection setup-time. Adding a new flow or changing the rates of the existing flows is quite difficult and time-consuming, since such modification can require re-computation of the whole table. Without such re-computation, it is frequently impossible to provide delay and even bandwidth guarantees even for a feasible rate assignment. Consequently, these table updates tend to be performed less frequently than may be desired. Second, per-packet delay guarantees of the existing flows can be temporarily violated due to such re-computation. Third, there exists the necessity to constrain the supported rates to a rather coarse rate granularity and to restrict the smallest supported rate in order to limit the size of the schedule table. All of these limitations serve to substantially reduce the flexibility of providing QoS.

At this time, no other algorithms for providing bandwidth and delay guarantees in input-buffered crossbars are known to the inventors hereof. The search for scaleable solutions which can provide QoS guarantees has led to several notable advances in the art. In one approach, an algorithm allows for the emulation of a non-blocking output-buffered switch with an output FIFO queue by using an input-buffered crossbar with speedup independent of the size of the switch. See B. Prabhakar and N. McKeown, "On the Speedup Required for Combined Input and Output Queued Switching," Computer Systems Lab. Technical Report CSL-TR-97-738, Stanford University. More specifically, this reference proves that such emulation is possible with a speedup of 4 and conjectures that a speedup of 2 may suffice. This result is quite important, as it allows one to emulate a particular instantiation of a non-blocking output-buffered architecture without having to use the speedup of the order of the switch size (i.e., speedup equal to the number of ports). However, this algorithm is only capable of a very limited emulation of an output buffered switch with FIFO service. Furthermore, as described in the above-referenced technical report, such emulation does not provide any delay guarantees. Its capability of providing bandwidth guarantees over a large time scale is limited to flows which are already shaped according to their rate at the input to the switch, and no bandwidth guarantees can be provided in the presence of misbehaved flows.

It should be noted that in speeded-up input buffered architectures the instantaneous rate of data entering an output channel may exceed the channel capacity. Therefore, buffering is required not only at the inputs, but also at the outputs. Therefore, input-buffered crossbar switches with speedup are also known as combined input/output buffered switches. Hereinafter, the more conventional term "speeded-up input-buffered crossbar" shall be used.

Another published study of speeded-up input buffered switches suggests that inputbuffered switches with even small values of speedup may be capable of providing delays comparable to those of output-buffered switches, but is silent as to the kind (if any) of worst case guarantees provided in the framework described therein. See R. Guerin and K. Sivarajan, "Delay and Throughput Performance of Speeded-up Input-Queuing Packet Switches," IBM Research Report RC 20892, June 1997.

Thus, there exists a present need in the art to provide deterministic delay and bandwidth guarantees while utilizing the scalability of a crossbar architecture with speedup.

SUMMARY OF THE INVENTION

Accordingly, it is an object of the present invention to provide deterministic delay and bandwidth guarantees in an input-buffered switch with speedup.

It is yet another object of the present invention to ensure the bandwidth and delay guarantees to all flows independently of the behavior of other flows.

It is still yet another object of the present invention to accommodate dynamically changing load and flow composition while operating at high speed, as well as avoid the imposition of artificial restrictions on supported rates.

In accordance with the purposes of the present invention, as embodied and described herein, the above and other purposes are attained by an apparatus and corresponding method for providing bandwidth and delay guarantees in an input-buffered switch with speed-up having input channels and output channels for transferring cells therebetween. In a broad sense, the apparatus includes a set of flow queues corresponding to individual flows and a set of peroutput-channel queues in each of the input channels for buffering cells awaiting transfer to the output channels. Also residing in each input channel is a flow-level scheduler for scheduling the flow queues and assigning cells for such flow queues to the appropriate per-output-channel queues. Each flow has a rate assigned to it (for example, at connection setup time, or during renegotiation during the lifetime of a flow). Each per-output-channel queue, which corresponds to a different output channel, has an assigned rate and an ideal service associated therewith. The rate of a per-output-channel queue is computed as the sum of rates of all flows destined from the input channel to the output channel corresponding to this queue.

Also included in the apparatus of the present invention is a rate controller corresponding to each input channel for operating on the per-output-channel queues. The rate controller schedules for a given cell slot the per-output-channel queues in the input channel to which it corresponds. The rate controller is defined so as to guarantee to each corresponding per-output-channel queue an amount of actual service that is within fixed bounds from the ideal service of that per-channel-output queue. The fixed bounds, which are constants expressed in units of cells, each are equal to one cell. There is further included an arbiter, responsive to the scheduling of each per-output-channel queue by the rate controller to which it corresponds, for controlling the processing of the queued cells in the scheduled queues through the switch from the input channels to the output channels at a speedup S equal to a number of phases per cell slot. The arbiter, which associates with each scheduled queue a timestamp equal to the time at which such queue was scheduled, uses a specific maximal match computation to choose one of the scheduled per-output-channel queues from which a cell may be transmitted in each phase.

In a narrower sense, each rate scheduler runs a Rate-controlled Smallest Eligible Finish Time First (RSEFTF) algorithm. For each per-output-channel queue, the rate scheduler maintains a first and a second state variable, the first state variable corresponding to an ideal beginning time of the next cell of the per-output-channel queue and the second state variable corresponding to an ideal finishing time of transmission of the next cell of the per-output-channel queue. The rate controller selects as eligible all per-output-channel queues having an ideal beginning time which is less than or equal to a current channel clock counter value. It then chooses as scheduled the eligible queue having the smallest finish time and, for the chosen eligible queue, updates the first state variable with the ideal finish time and second state variable with the ideal beginning time plus one divided by the assigned rate of the queue.

According to another narrower aspect of the present invention, the specific maximal match computation performed by the arbiter is as follows. First, there is provided a Set_Match set and Set_Queues set, the former being initialized to an empty set and the latter to the set of the associated timestamps. Next, the arbiter selects the smallest of the associated timestamps stored in Set_Queues, consequently adding the selected associated timestamp to Set_Match and removing the selected associated timestamp from Set_Queues. All remaining associated timestamps associated with per-output-channel queues corresponding to either the same input channel or output channel as the selected associated timestamp are then deleted from Set_Queues. If the Set_Queues set is empty, the arbiter sends an indication of the per-output-channel queues corresponding to the timestamps in the Set_Match set to the input channels to which they belong. If the Set_Queues set is not empty, the computation returns to the step of selecting.

In an alternative embodiment of the present invention, the queue scheduling of the rate controller is a centralized function. That is, the arbiter runs all of the rate controllers locally.

The present invention achieves several important goals. It provides deterministic delay guarantees while utilizing the scalability of a crossbar architecture. It allows arbitrary assignment of guaranteed rates (as long as the rates are feasible in the sense that the sum of all rates does not exceed the total available bandwidth at any input or any output). Additionally, it allows the flexibility to quickly admit new flows and change the rate assignment of existing flows. Moreover, it provides the protection of these guarantees to well-behaved flows even in the presence of misbehaved flows.

More specifically, it can be proved that deterministic bandwidth and delay guarantees can be obtained with speedup greater than or equal to 3 in a switch with 100% load of all links. With no speedup or with small values of speedup, the system is capable of providing similar deterministic guarantees if the load due to guaranteed flows is limited to a certain portion (S/3) of the bandwidth of any link. The remaining bandwidth can be used by best-effort traffic. The proof of these statements can be found in the Appendix. Furthermore, it is conjectured that similar guarantees can be provided with speedup of greater than or equal to 2 and full load of the link, and with any speedup greater than or equal to one with load due to guaranteed flows limited to 50% of the link bandwidth.

While the invention is primarily related to providing bandwidth and delay guarantees to flows requiring such guarantees, it can be used in conjunction with best-effort traffic which does not require such guarantees. If best effort traffic is present, it is assumed that the invention as described herein is run at an absolute priority over any scheduling algorithm for best effort traffic.

BRIEF DESCRIPTION OF THE DRAWINGS

The above objects, features and advantages of the present invention will become more apparent from the following description of the embodiments of the present invention illustrated in the accompanying drawings, wherein.

DESCRIPTION OF THE PREFERRED EMBODIMENTS

Figure 1:
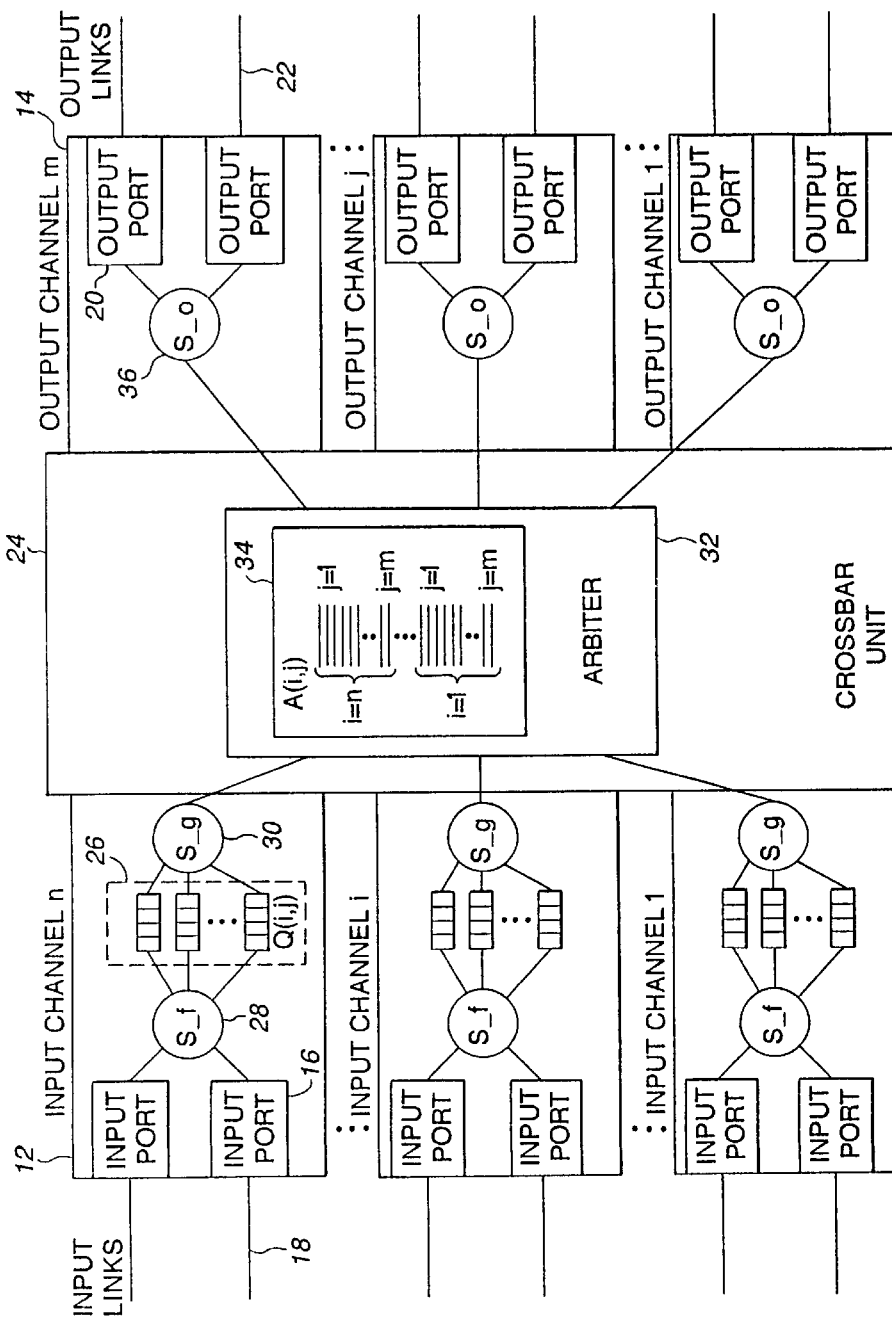
FIG. 1 is block diagram depicting an input-buffered crossbar switch capable of utilizing per-output-channel queue scheduling and arbitration schemes in accordance with the present invention.

Referring to FIG. 1, with like reference numerals identifying like elements, there is shown an input-buffered crossbar switch 10 implementing a crossbar arbitration scheme in accordance with the present invention. As illustrated in FIG. 1, the underlying architecture of the input-buffered crossbar switch 10 is represented as an n×m crossbar. Here, "n" is the number of input channels i ($1 \leq i \leq n$) 12 and "m" is the number of output channels j ($1 \leq j \leq m$) 14. Each input channel has one or more input ports 16, each of which corresponds to a physical input link 18. Similarly, the output channels each have one or more output ports 20, each corresponding to a physical output link 22. The input channels 12 are connected to the output channels 14 by way of a crossbar unit 24. It will be understood by those skilled in the art that the crossbar unit as depicted in FIG. 1 includes a crossbar switch fabric of known construction, the details of which have been omitted for purposes of simplification. It is the crossbar switch fabric that is responsible for transferring cells between input and output channels.

In the embodiment shown, the total capacity of all input channels and all output channels is assumed to be the same, although the capacity of individual links may be different. Hereinafter, the capacity of a single channel is denoted by $r\_c$. The speed of the switch fabric, denoted by $r\_sw$, is assumed to be S times faster than the speed of any channel. In general, the switch and the channel clocks are not assumed to be synchronized. The speedup values may be arbitrary (and not necessarily integer) values in the range of $1 \leq S \leq n$. It is further assumed that the switch operates in phases of duration $T\_sw$ defined as the time needed to transmit a unit of data at speed $r\_sw$. Such phases are referred to as matching phases. In this disclosure, a unit of data shall be referred to as a cell. Accordingly, a switch can move at most one cell from each input channel and at most one cell to each output channel at each matching phase. Therefore, on the average, a switch with speedup S can move S cells from each input channel and S cells to each output channel. At S=n, the switch is equivalent to the output buffered switch.

Although not shown in FIG. 1, packets received on a given input link 18 are typically buffered at the input ports. Also, each flow to which the received packets correspond may be allocated a separate buffer or queue at the input channel. These "per-flow" queues may be located in an area of central memory within the input channel. Alternatively, flow queues may be located in a memory in the input ports associated with the input channel. When the packets received from the input links are of variable length, they are fragmented into fixed-size cells. If the packets arriving to the switch all have a fixed length (e.g. cell in ATM networks), no fragmentation is required. In packet switching networks, where arriving packets are of different size, the implementation is free to choose the size of the cell as convenient. The tradeoff in the choice of this size is that the smaller the cell, the better delay guarantees can be provided, but the faster the switch fabric must be (and therefore the more expensive the switch). Small cell size also increases fragmentation overhead. Upon arrival and after possible fragmentation, cells are mapped to a corresponding flow (based on various classifiers: source address, destination address, protocol type, etc.). Once mapped, the cells are placed in the appropriate "per-flow" queue.

Associated with each flow requiring bandwidth and/or delay guarantees is some rate $r\_f$. Typically, for guaranteed rate or guaranteed delay flows, the rate $r\_f$ is established at connection setup time (e.g., via RSVP). Rates assigned to guaranteed flows can also be changed during a renegotiation of service parameters as allowed by the current RSVP specification. It is assumed that the rate assignment is feasible, i.e., the sum of the rates of all flows at each input port does not exceed the capacity of this input port, and the sum of rates of all flows across all input ports destined to a particular output port does not exceed the capacity of that output port. The feasibility of rates across all input and output ports implies the feasibility of rates across all input and output channels. Included in the rate $r\_f$ guaranteed to the flow is any overhead associated with packet fragmentation and re-assembly. The actual data rate negotiated at connection setup may therefore be lower. For networks with fixed packet size, such as ATM, however, no segmentation and re-assembly is required. Thus, no overhead is present.

As shown in FIG. 1, each input channel i 12 has m per-output-channel queues 26 (also referred to as per-output or virtual output queues), denoted by $Q(i,j)$, $1 \leq j \leq m$, one for each output channel j 14. In the embodiment shown in FIG. 1, the input channel maintains a single flow-level scheduler $S\_f(i)$ 28, which needs to schedule only a single flow per cell time. Once scheduler $S\_f(i)$ schedules some flow f, it adds the index of this flow f (or, alternatively, the head of the line (HOL) cell of flow f) to the tail of queue $Q(i,j)$. Thus, depending on the implementation, $Q(i,j)$ may contain either cells or pointers to cells of individual flows.

Also located at each input channel 12 is a rate controller 30 (or scheduler $S\_q(i)$), which schedules or selects for processing one (or more) of the virtual output queues $Q(i,j)$ at every channel cell time. The channel cell time is defined as the time required to transmit one cell at channel speed. The scheduler S_q ensures that the aggregate of all flows destined from a given input to a given output is guaranteed the bandwidth r_i,j equal to the sum of individual flow rate assignment over all flows destined from a given input to a given output, as well as per-cell delay. An example of scheduler S_q is described in paragraphs below. Indices of (or pointers to) the queues Q(i,j) chosen at each cell time are given to an arbiter 32, which is located in the crossbar unit 24. It is the arbiter's responsibility to determine which of the input channels should be able transmit a cell to particular output channels. It is assumed that the arbiter operates in phases, also referred to as "matching phases". The duration of each phase is equal to the duration of the channel cell slot divided by the speedup S. The goal of the arbiter is to compute a maximal (conflict-free) match between the input and output channels so that at most one cell leaves any input channel and at most one cell enter any output channel during a single matching phase. Although the term "maximal match" (or, alternatively, "maximal matching") is well understood by those skilled in the art, a definition may be had with reference to papers by N. McKeown et al. and Stiliadis et al., cited above, as well as U.S. Pat. No. 5,517, 495 to Lund et al.

The arbiter maintains n×m queues 34, denoted by A(i,j), with each arbiter queue corresponding to a different one of Q(i,j). The arbiter queues 34 are used to store timestamps as described below. At each channel cell time the arbiter receives the index (or indices) of the per-output queue(s) Q(i,j) chosen by the input scheduler S_q(i) at this channel slot time. When the arbiter 32 receives the index of some Q(i,j), it adds a timestamp equal to the current time into the corresponding queue A(i,j).

As explained above, during each of its matching phases, the arbiter decides which input can send a cell to which output by computing a maximal matching between all inputs and all outputs. The algorithm used to compute the maximal match is described in detail in paragraphs to follow. Once the matching is completed, the arbiter notifies each input of the output to which it can send a cell by sending to the input channel the index of the per-output queue from which the cell is to be transmitted. The input channel then picks a cell to send to that output channel and the cell is transmitted to the output channel.

When an input channel 12 receives from the arbiter the index of the Q(i,j) corresponding to the output channel for the current matching phase, it forwards the HOL cell of Q(i,j) (or, alternatively, the cell pointed to by the HOL pointer in Q(i,j)) to the output channel j. If Q(i,j) is empty (that is, there is no cell of a guaranteed flow in the queue), then a cell of a lower-priority service destined to the same output is sent instead. If there is no best effort traffic at this input matching phase, then no cell is sent. The size of Q(i,j) is determined by the properties of the schedulers S_f and S_q.

In another variation, each input channel could maintain one flow-level scheduler S_(i,j) for each output. When the input channel i needs to transmit a cell to a given output j, it invokes scheduler S_f(i,j) to determine which flow destined to j should be chosen. Unlike the option described above, in which scheduler S_f(i) can run at link speed, the flow-level schedulers S_f(i,j) must be capable of choosing up to S cells per cell time as it is possible that this input may need to send a cell to the same output in all S matching phases of the current cell slot.

In yet another approach, the input can run m parallel S_f schedulers, one per output. Each of these schedulers may schedule 1≤k≤S cells per cell time. When a flow is scheduled by S_f, an index to this flow is added to Q(i,j).

Although not shown in FIG. 1, a cell forwarded by an input channel i to an output channel j is added to a queue maintained by the output channel. A variety of queuing disciplines can be used, such as FIFO, per-input-port, or per flow. If the queue is not a simple FIFO, each output has an additional scheduler, shown in FIG. 1 as output scheduler S_o 36. This output scheduler determines the order in which cells are transmitted onto the output link from the output channel. It is assumed that any required reassembly occurs before S_o is used, so that S_o schedules packets rather than cells.

Any known QoS-capable scheduler such as those mentioned in the background section can be used for the scheduler S_f and S_o.

Since each scheduler S_f, S_o operates independently of the other, the delay of an individual cell in the switch is the sum of the delay of this cell under its input and output schedulers S_f and S_o, plus the delay due to the potential arbitration conflicts. The delay of a packet segmented in cells is comprised of the delay experienced by its last cell plus the segmentation and re-assembly delays.

Still referring to FIG. 1, it can now be appreciated that, with respect to each input channel, S_q operates on each of the queues Q(i,j) containing cells (or pointers to cells) which have already been scheduled by S_f but which have not yet been transmitted to their destination output channel due to arbitration conflicts. The present invention undertakes the task of determining the sequence of transmissions between input channels and output channels satisfying the crossbar constraint that only one cell can leave an input channel and enter an output channel per phase in such a way that the arbitration delay is bounded for each cell awaiting its transmission at the input channel. In the system as partitioned in the embodiment shown in FIG. 1, this task is distributed among the arbiter and the input channels. This task is discussed in further detail below.

Figure 2:
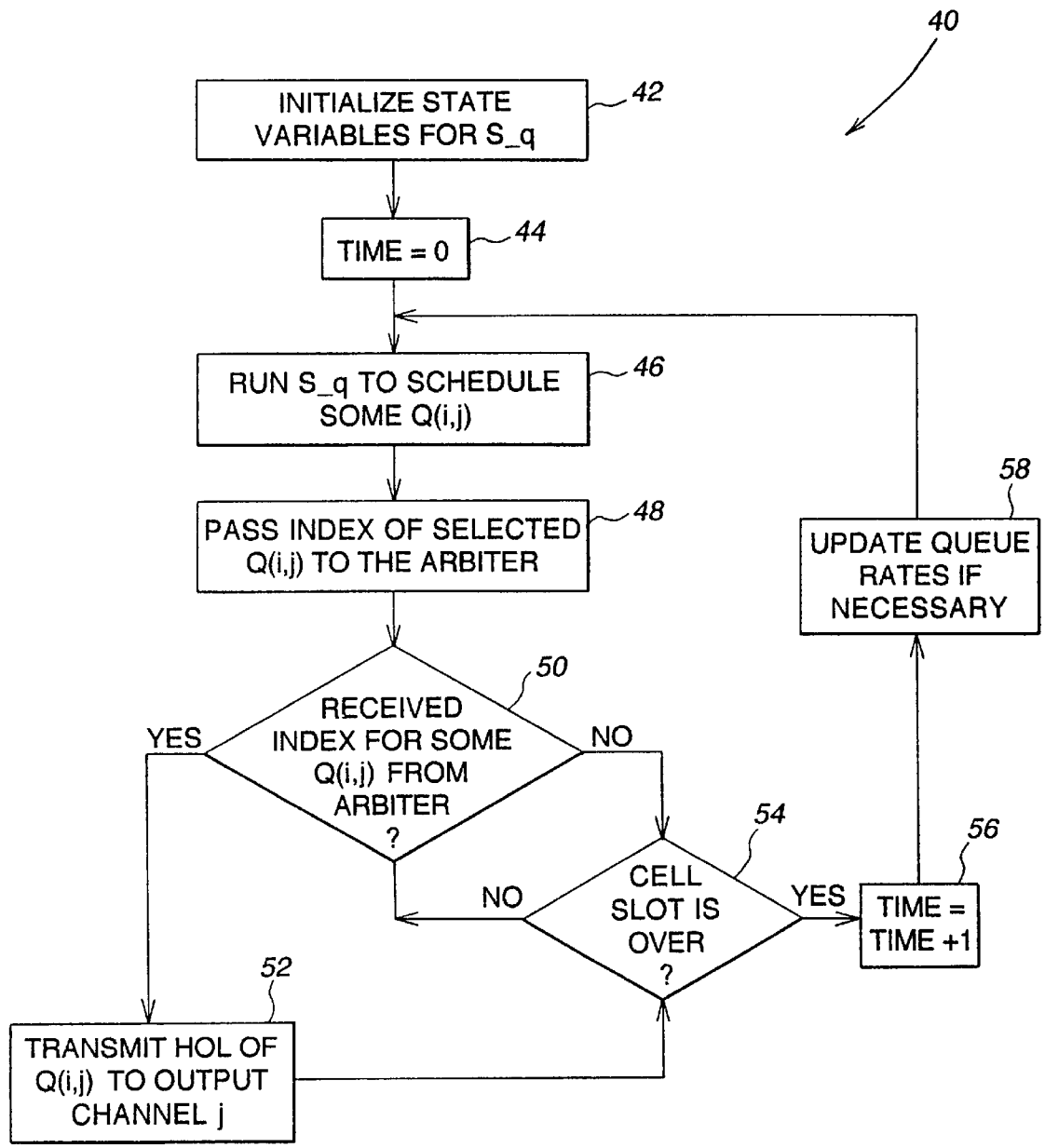
FIG. 2 is a flow diagram illustrating the actions of the input channel related to scheduling per-output-channel queues.

Now referring to FIG. 2, there is illustrated the actions of the input channel with respect to scheduling the per-output channel queues and the interaction with the arbiter in accordance with the present invention. At the initial step 42, the input channel initializes associated state variables and obtains the assigned rates r_i,j (again, equal to the sum of rates of all flows going from input i to output j) for the queues Q(i,j). The sum of all rates is feasible in that the sum of rates r_i,j across all inputs channels i is less than or equal to the channel rate r_c and the sum of rates r_i,j across all outputs channels j is less than or equal to r_c. The feasibility is ensured by admission control or by other means not discussed herein. In step 44 the input channel initializes its clock counter (denoted time) to zero. The unit of time for this clock is one channel cell slot. Further, in step 46, which is invoked each cell slot, the scheduler S_q is run to determine the queue Q(i,j) to be selected or scheduled during this time slot. The operation of scheduler S_q will be discussed in more detail later with reference to FIG. 4 . In step 48 the index of the queue selected in step 46 is passed to the arbiter. In step 50 the input channel checks if the arbiter has notified it of any of its queues Q(i,j) having been matched during this cell slot. If so, the HOL cell in the matched queue is transmitted to the corresponding output channel in step 52. Steps 50, 52, 54 may be repeated several times during one cell slot, since there may be several matching phases occurring during one cell slot. At the end of the cell slot the clock counter is incremented (step 56). To accommodate potential rate changes the rates r_i,j are updated if necessary as indicated in step 58.

Figure 3:
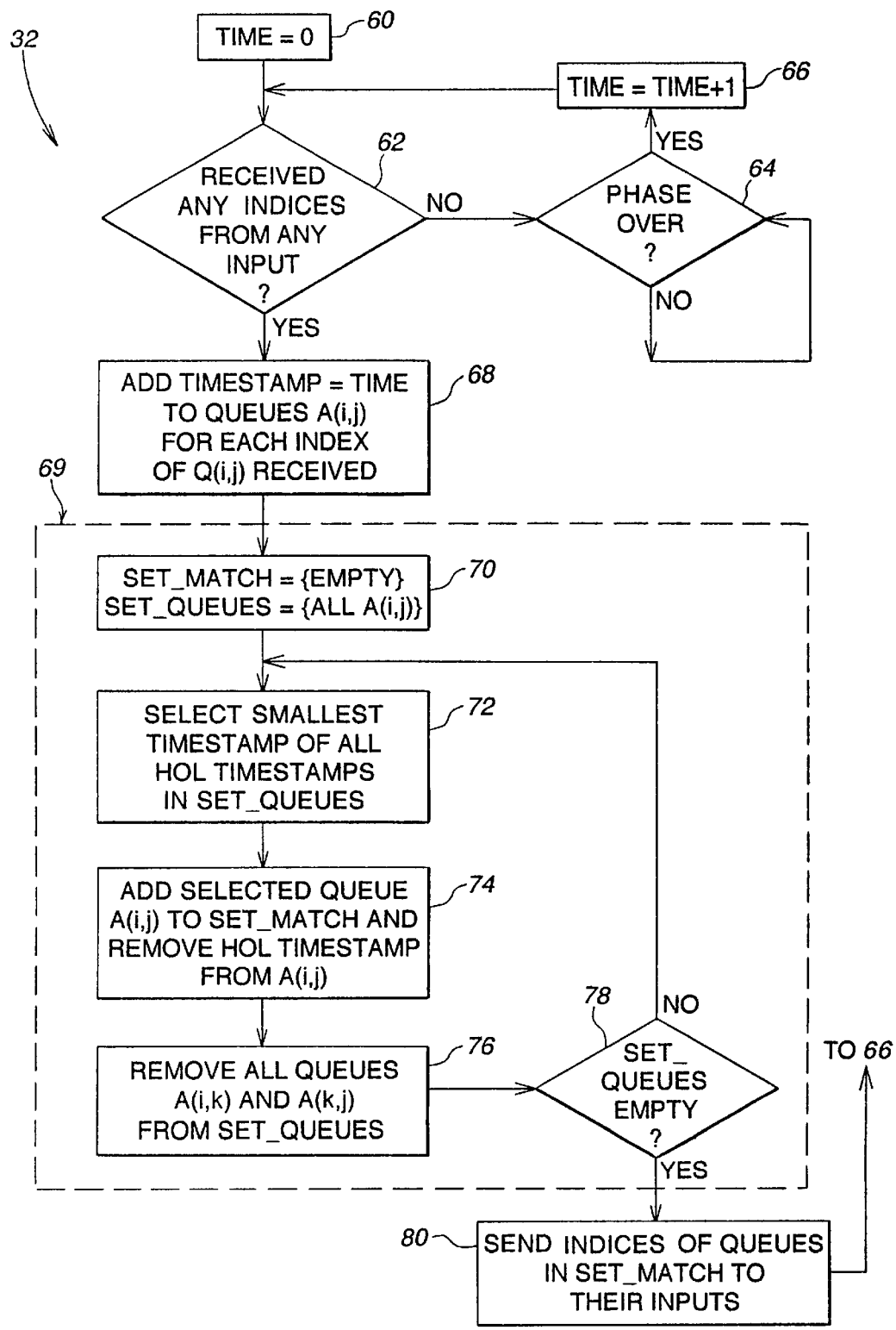
FIG. 3 is a flow diagram depicting the arbitration policy for providing bandwidth and delay guarantees in accordance with the present invention.

The operation of the arbiter 32 is now described with reference to FIG. 3. As illustrated FIG. 3 at the initial step 60, the arbiter clock is initialized to zero. The unit of time for this clock is the duration of one matching phase. At the beginning of any matching phase, the arbiter checks if any queue indices have been sent to it by input channels (step 62). If the arbiter has not received any queue indices, it determines when the current matching phase is over at step 64. Once it has been determined that the current phase is over, the clock counter time is incremented by one at step 66. If the arbiter has received any queue indices in the current phase, it adds a timestamp equal to the current clock counter value to the tail of the queues A(i,j) corresponding to the queues Q(i,j) whose indices have been received in step 62 (step 68).

The maximal match computation 69, which is used to generate a match, is performed according to the present invention as shown in steps 70, 72, 74, 76, 78. A match is defined as a conflict-free set of input/output pairs and is computed based on the current contents of queues A(i,j) at the arbiter. Beginning with step 70, the arbiter initializes a first set Set_Match to an empty set and a second set Set_Queues to the set of all non-empty queues A(i,j). In step 72, the arbiter finds the smallest timestamp of all Head-of-Line (HOL) timestamps in set Set_Queues. The queue A(i,j) containing the smallest timestamp found in step 72 is added to Set_Match in step 74. In step 76, the arbiter removes from set Set_Queues all queues A(i,k) and A(k,j) where i and j are the input and output of the queue A(i,j) selected in step 72 (these are all queues corresponding to the same input and the same output as those of A(i,j) already added to the match). If there are no more unmatched queues (step 78), the match is complete. Consequently, the arbiter sends the inputs the indices of the matched queues at step 80 and returns to step 66. Otherwise, the arbiter goes to the next iteration of the matching process (by returning to step 72).

Another essential element of the invention is the choice of a rate-controller S_q operating on the per-output queues Q(i,j) at each input. More specifically, rate-controller S_q is defined as a rate controller capable of guaranteeing each per-output queue its assigned rate r_i,j and offering an amount of service W_i,j(t) to each per-output queue in any interval (O,t) so as to satisfy the following condition $$tr\_i,j - E1 \leq W\_i,j(t) \leq tr\_i,j + E2 \qquad (eq1)$$

where E1 and E2 are the late and early work discrepancy bounds respectively, which are assumed to be constants and are expressed in the units of cells. In the embodiments described herein, E1=E2=1 cell. E1 and E2 should be interpreted as the lower and upper bounds on the discrepancy between W_i,j(t) (the amount of actual service given by S_q to queue Q(i,j), expressed in cells) and the ideal service tr_i,j cells that same queue should have received in this interval under the fluid model (recall that the rates arc assumed to be expressed in units of cells per a unit time). Thus, any S_q satisfying the above condition at all times t can be used to provide rate and bandwidth guarantees with the values of speedup independent of the size of the switch.

Figure 4:
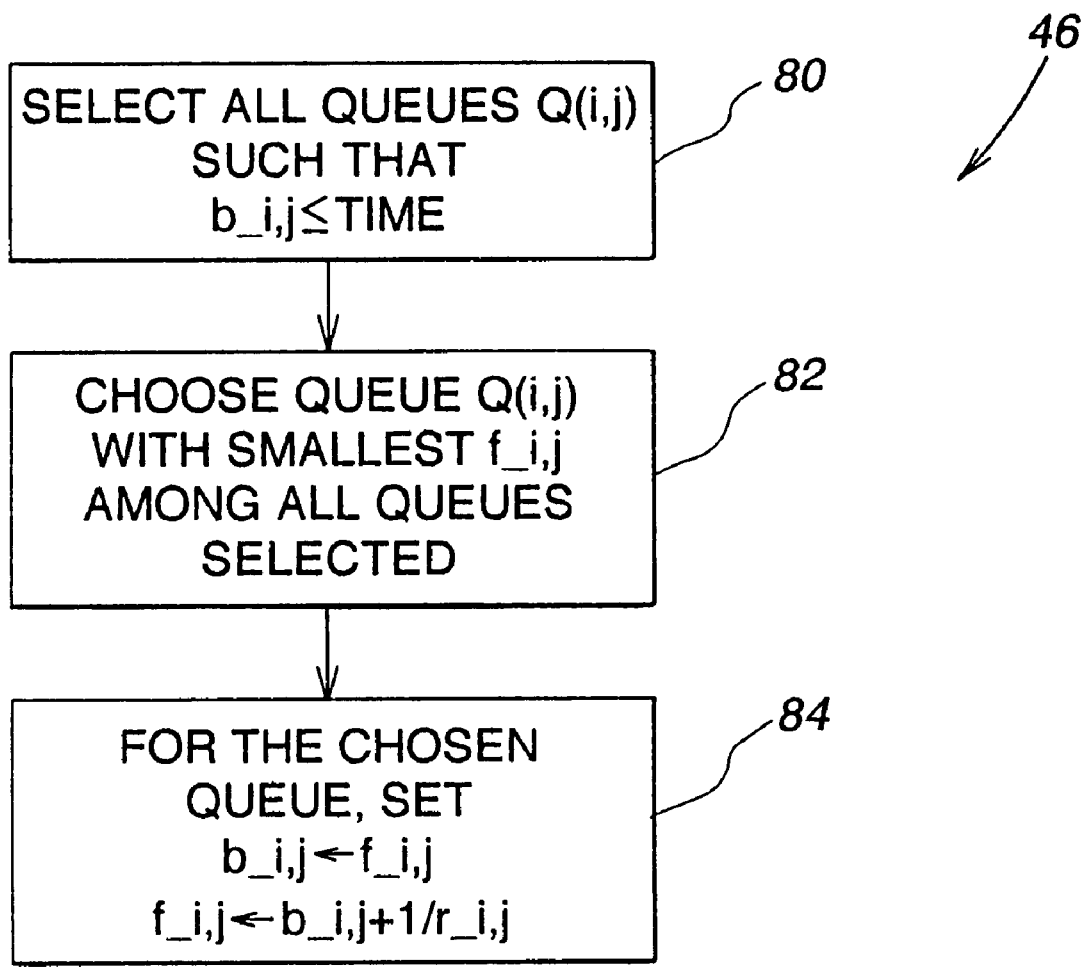
FIG. 4 is a depiction of one example of the scheduling policy for per-output-channel queues in the input channel shown in FIG. 2.

One instantiation of a scheduler S_q which performs the queue scheduling operation depicted in step 46 of FIG. 2 and satisfies the above-stated condition (eq1) is now considered with reference to FIG. 4. This particular rate controller, essentially equivalent to a rate-controlled version of WF2Q by Bennett et. al., mentioned in the Background section, is based on a Rate-controlled Smallest Eligible Finish Time First (RSEFTF) algorithm. For each of the peroutput queues Q(i,j), RSEFTF maintains two state variables: a first state variable b_i,j, which is the ideal beginning time of transmission of the next cell of this queue, and a second state variable f_i,j, which is the ideal finishing time of transmission of the next cell of this queue. Initially, b_i,j=0 and f_i,j=1/r_i,j (the initialization of these state variables occurs in step 42 of FIG. 2). As shown in step 80 of FIG. 4, the scheduler selects all queues at this input for which b_ij is less than or equal to the current channel cell slot time (channel clock counter time). Such queues are called eligible queues. In step 82, the scheduler then chooses as scheduled the queue Q(i,j) with the smallest finish time f_i,j from among the eligible queues. Ties are broken arbitrarily. The queue chosen in step 82 is the one whose index is sent to the arbiter in step 48 of FIG. 2. In step 84, the scheduler updates the state variables b_ij and f_ij corresponding to the chosen queue as follows: b_ij←f_ij, f_ij←b_ij+1/r_ij. The variables $b_{\_i,j'}$ and $f\_i,j'$ for all j' not equal to j (i.e., for the queues not chosen at the current cell slot) remain unchanged.

It can be shown that the described embodiment satisfies several properties. Property 1 is as follows: In an n×m crossbar running RSEFTF with integer speedup S≧3 and matching phases synchronized with input cell times, arbitration delay of any cell never exceeds n channel cell times. More specifically, any cell scheduled at the beginning of cell slot t is transmitted before the beginning of cell slot t+n. This is true for arbitrary feasible rate assignment. Property 2 is as follows: In an n×m crossbar running RSEFTF, for arbitrary (not necessarily integer) speedup S≧3 and no assumption on synchronization between the channel clock and the switch clock (i.e., no alignment of matching phases and cell slots is assumed), arbitration delay of any cell is bounded by n as long as for any output j the rate assignment satisfies $\Sigma\_i$ (r_i,j)<1. The proof of properties 1 and 2 is given in the Appendix. Note that Property 1 holds for any feasible rate assignment, while Property 2 has been proved only for the case when the sum of rates of all queues at all inputs corresponding to an output channel is strictly less than the capacity of the output channel. However, since this sum can be arbitrarily close to the channel capacity, for all practical purposes this limitation is unimportant. Although properties 1 and 2 have been proven only for speedup S≧3, simulations indicate that the speedup S≧2 is sufficient to obtain the delay bound of n. It can be conjectured, therefore, that Properties 1 and 2 also hold for S=2.

Since the cost of the switch is typically the higher the larger the speedup, the application of the present invention in switches with speedup 1≦S≦3 is now explored in some detail. Here, the method and apparatus of the present invention can be used without modification if, instead of allowing arbitrary feasible rate assignment, the total bandwidth allocated to guaranteed flows is restricted to a certain portion of the link bandwidth. More specifically, it can be shown that: for arbitrary 1≦S≦3, with no assumption on synchronization of cell slot and phase clocks, if the rate assignment of guaranteed flows satisfies (1) $\Sigma\_i(r\_i,j)<S/3$, $\Sigma\_j(r\_i,j) \leq S/3$ OR (2) $\Sigma\_i(r\_i,j) \leq S/3$, $\Sigma\_j(r\_i,j)<S/3$, then the arbitration delay of any cell is bounded by 3(n+m)/S−1 [Property 3]. The proof of Property 3 is also given in the Appendix. Property 3 demonstrates that even in switches with small speedup or no speedup at all, as long as the sum of rates of guaranteed flows does not exceed the ratio S/3 of the link bandwidth, each cell can be guaranteed deterministic arbitration delay and therefore deterministic total delay in the switch. This delay is the larger the smaller the speedup value. The restriction on the sum of the rates can be achieved by admission control or by other means, which are not discussed in this disclosure.

There are many ways to implement various known components of the described embodiment. Therefore, the details of such implementations are largely omitted from the disclosure. However, memory requirements at the arbiter are now discussed briefly. The arbiter needs to store timestamps of the cells scheduled by input schedulers S_q but not yet transmitted to their outputs. Memory requirements depend on the size of the timestamps stored in the arbiter and the number of such timestamps. Note first that the timestamps are integers, since they represent the matching phase number. At first glance, it may appear that the timestamps can grow infinitely large as the execution time increases. This would be impractical since the size of the timestamps and, consequently, memory requirements would be unbounded. However, the fact that the arbitration delay is bounded means that the difference between any two timestamps is bounded as well. This allows for the reduction in the range of timestamps to a limited range. The bound on arbitration delay also implies that the number of the timestamps that can be stored in the arbiter is limited as well. For example, Properties 1 and 2 demonstrate that with speedup $S \geq 3$ the arbitration delay of any cell can be at most n. Since for each input i at most one cell is scheduled per channel slot, it is clear that there can not be more than n timestamps in all queues A(i,j) corresponding to a single input i. It can be shown that this implies that no queue can contain more than n+1 timestamps, which implies that the total number of timestamps in the arbiter cannot exceed n(n+1). Therefore, at an additional expense of storage required for accounting to which queue a timestamp belongs, there is no need to store more than n(n+1) timestamps, since the memory can be dynamically allocated to a newly arrived timestamp. If the implementation chooses to statically allocate memory for all A(i,j), however, then the total amount of memory required is mn(n+1), because in the worst case n+1 timestamps can be in any of the nm queues.

Alternatively, the arbiter need not maintain all the timestamps of scheduled cells. Instead, part of the burden of maintaining timestamps is shifted to the input channel. This can be explained more clearly with reference to steps 48 of FIG. 2 and step 68 of FIG. 3. At step 48, the timestamps communicated by the input channel to the arbiter at the beginning of each matching phase include only those timestamps corresponding to scheduled HOL cells in each queue. If the scheduler S_q can only schedule one cell per cell time (that is, the scheduler S_q operates at the speed of the input channel), then the input channel need only communicate at most two timestamps to the arbiter: one for the queue whose cell was transmitted to the output at the end of the previous matching phase (and there could only be at most one such cell per input), and one for the cell which has just been scheduled by S_q at the current channel cell time. If the scheduler S_q operates faster than the speed of the channel, then more than one cell can be scheduled per channel cell time. At step 68, then, the arbiter receives at most two timestamps per input/output pair. Consequently, since only one timestamp now needs to be stored per each A(i,j), memory requirements of the arbiter are reduced, but at the expense of increased communications between the input channels and the arbiter and at the expense of additional storage at the input, as the input channel now needs to store not only the cell (or the pointer to the cell) scheduled by S_q, but also the time at which it was scheduled.

As described above and shown in FIG. 1, the S_q portion of the arbitration mechanism is decentralized at the input channels. Alternatively, the arbiter can run all of the rate controllers S_q locally. To do so, the arbiter treats the arrivals to the per-output queues at the input channels as occurring exactly at their ideal times and at their ideal rates. Conceptually, it maintains for each input/output pair a queue A(i,j) to which imaginary "dummy" cells arrive according to their ideal inter-arrival times. It then runs n copies of the S_q rate controller (one per each input) to determine the scheduling order of these dummy cells. The operation of the input channel is now simplified by omitting steps 46 and 48 of FIG. 2. While step 48 is eliminated completely, step 46 as performed by the arbiter for all input channels in parallel (step 46') replaces steps 62, 64 and 66 in FIG. 3. The rest of the operation follows that of the distributed version described above in reference to FIG. 2 and FIG. 3. As should be clear from this description, the arbiter is not provided with queue indices for queues scheduled by each input channel at each cell time. Rather, the arbiter obtains this information for itself. Unlike the implementations previously described, this approach clearly puts a higher load on the arbiter in terms of computation and storage, while reducing the amount of communication between the input channels and the arbiter. With this approach, it is possible that some queue Q(i,j) at the input channel is matched when this queue is empty. In this case the input channel simply does not send any guaranteed cell. If best effort traffic is present, the opportunity to transmit the cell is passed to best effort traffic.

In all options of the preferred embodiment as described thus far, there is a scheduler S_q per each input channel. Where the schedulers S_q are run by the input channels, the computational work required for the scheduling decision is distributed among input channels and therefore the computational load is reduced. As discussed above, it is also possible to perform all scheduling decisions at the arbiter by running in parallel schedulers S_q for each of the input channels. In this case, the complexity of the arbiter is increased, but there is substantial saving in the amount of communication required between input channels and the arbiter. Properties 1,2 and 3 described above hold for either one of these two options.

While the disclosed input-buffered switch and scheduling method has been particularly shown and described with reference to the preferred embodiments, it will be understood by those skilled in the art that various modifications in form and detail may be made therein without departing from the scope and spirit of the invention as set forth by the claims. Accordingly, modifications such as those suggested above, but not limited thereto, are to be considered within the scope of the claims.

APPENDIX

It is assumed that all cells are scheduled by their S_q scheduler at the beginning of a channel cell slot and immediately become available for the arbiter. Matching occurs at the right-hand boundary (i.e. at the end) of a matching phase. Only cells available to the arbiter at the beginning of a matching phase participate in the matching process during this phase. It is also assumed that, if a phase boundary coincides with a slot boundary, all departures at this phase boundary occur prior to the scheduling decisions of S_q at the beginning of the next cell slot. The term "cell slot" shall be used to denote channel cell slot.

Lemma 1. If a cell c(i,j) has been scheduled before or at the
    beginning of a matching phase and remains there at the end of this matching phase, then a cell with smaller or equal scheduling time went from input i or to output j.

Proof.

By operation of the algorithm matching occurs in the increasing order of scheduling times. Therefore, if no other cell has gone from input i or to output j in a match, by operation of the algorithm, this cell would have gone. This is a simple consequence of the input-output contention.

Definition. Arbitration delay of a cell is the time elapsed between the time it is scheduled by its input scheduler $S\_q$ and the time it is transferred to its output.

Property 1. In an n×m crossbar (n inputs m outputs) running RSEFTF with integer speedup S>=3 and matching phases aligned with input cell times, arbitration delay of any cell never exceeds n channel cell times. More specifically, any cell scheduled at the beginning of cell slot t is transmitted before the beginning of cell slot t+n. This is true for arbitrary feasible rate assignment.

Proof.

Consider the first time t this is violated for one or more cells in the switch. There must be one or more cells which were scheduled at or before the beginning of cell slot t−n and which still remain at their inputs at the beginning of cell slot t. Let c(i,j) denote the cell with the earliest scheduling time of all such cells (if there are several cells with the same earliest scheduling time, we pick any of them). This cell must have been scheduled by its scheduler $S\_q$ at the beginning of cell slot t−n. This is because if it were scheduled later, it would not have violated its delay bound n by time t, and if it were scheduled earlier, its delay bound would have been violated before t, which would contradict the assumption that t was the first time a violation occurred. For integer speedup S with matching phases synchronized with cell times, there are exactly nS matching phases which had occurred between the beginning of cell slot t−n and the beginning of cell slot t. By Lemma 1, in order for cells c(i,j) to remain at its input at time t, there must have been at least nS cells with smaller or equal timestamps than t−n (which is the timestamp of c(i,j)) which were scheduled by the $S\_q$ scheduler at input i and/or by any input scheduler $S\_q$ destined to output j.

Clearly, no cell scheduled after time t−n will have a timestamp less than or equal to t−n. This means that, in order for c(i,j) to remain at its input at time t, at time t−n there must have been at least nS cells aside from c(i,j) at input i and/or at any input destined to output j, which had been scheduled by the scheduler $S\_q$ at or prior to the beginning of time t−n, but not transmitted yet by that time. By the assumption of t−n being the earliest scheduling time of any cell which violated delay bound n, all cells which were scheduled by their $S\_q$ schedulers at or prior to time t−2n would have been transmitted by the beginning of cell slot t−n. Therefore, the only cells which can be not yet transmitted by time t−n are those which were scheduled in n cell slots t−2n+1, t−2n+2 . . . t−n, which includes c(i,j) itself. Since the input scheduler $S\_q$ schedules at most one cell per cell slot, there can be at most n−1 such cells at input i (not counting c(i,j)). By the properties of RSEFTF, each queue (i',j') can be scheduled at most n $r\_i',j'$+1 times in any n cell slots. Therefore, there can be at most $\Sigma\_i(n\ r\_i,j)$+n−1 cells scheduled in the interval (t−n−(n−1), t−n) of n cells slots long to output j (not counting c(i,j)). Therefore, the total number of cells at time t−n which are either at input i or destined to output j which could still be at their inputs at the beginning of cell slot t−n with time stamps less than or equal to t−n, not counting c(i,j) is at most 2n+$\Sigma\_i(n\ r\_i,j)$−1<3n. Therefore, for any S≧3 there will not be enough cells with smaller or equal timestamps than c(i,j) to prevent c(i,j) from leaving its input before time t. QED.

Property 2. In an n×m crossbar running RSEFTF, for arbitrary (not necessarily integer) speedup S≧3, with no assumption on synchronization between the cell slot clock and the phase clock (no alignment of phases in cell slots), arbitration delay of any cell is bounded by n−1 as long as for any output j $\Sigma\_i(r\_i,j)<1$.

Proof.

The proof is almost identical to that of Property 1. Consider the first time t this is violated for one or more cells in the switch. That is, at the beginning of some cell slot t, there is one or more cells which were scheduled at or before the beginning of cell slot t−n and which still remain at their inputs. Let c(i,j) the cell with the earliest scheduling time of all such cells (if there are several cells with the same earliest scheduling time, we pick any of them). This cell must have been scheduled by its scheduler $S\_q$ at the beginning of cell slot t−n. This is because if it were scheduled later, it would not have violated its delay bound n by time t, and if it were scheduled earlier, its delay bound would have been violated before t, which would contradict our assumption that t was the first time a violation occurred.

It is easy to see that for any speedup S there are at least nS−2 full matching phases which occur between the beginning of cell slot t−n and the beginning of cell slot t. By Lemma 1, in order for cell c(i,j) to remain at its input at time t, there must have been at least nS−2 cells with smaller or equal timestamps than c(i,j) scheduled from i and/or to j. Clearly, no cell scheduled after time t−n will have a timestamp less than or equal than t−n, which is the timestamp of c(i,j). This means that in order for c(i,j) to remain at its input at time t, at time t−n there must have been at least nS−2 cells aside from c(i,j) at input i and/or destined to output j which had been scheduled by the scheduler $S\_q$ at or prior o the beginning of time t−n, but were not transmitted yet by that time. By the assumption of t−n be the earliest scheduling time of any cell which violated delay bound n, all cells which were scheduled prior to time t−2n+1 would have been transmitted by time t−n. Therefore, the only cells which can be not yet transmitted by time t−n are those which were scheduled in n cell slots t−2n+1, t−2n+2 . . . t−n, which includes c(i,j) itself. Since the input scheduler $S\_q$ schedules at most one cell per cell slot, there can be at most n−1 such cells (not counting c(i,j)) at input i. By the properties of RSEFTF, each queue (i',j') can be scheduled at most n $r\_i',j'$+1 times in any n cell slots. Therefore, there can be strictly less than $S\_i(n\ r\_i,j)$+n−1 cells scheduled in the interval (t−2n+1, t−n) of n cells slots to output j (not counting c(i,j)). This is because by the statement of the theorem $\Sigma\_i(r\_i,j)<1$. Therefore, the total number of cells at time t−n which are either at input i or destined to output j which could still be at their inputs at the beginning of cell slot t−n with time stamps less than or equal to t−n, not counting c(i,j), is strictly less 2n+$\Sigma\_i(n\ r\_i,j)$−1<3n. Therefore, for any S≧3 there will not be enough cells with smaller or equal timestamps than c(i,j) to prevent c(i,j) from leaving its input before time t. QED.

Property 3. For arbitrary 1≦S<3, with no assumption on synchronization of cell slot and phase clocks, if the rate assignment of guaranteed flows satisfies (1) $\Sigma\_i(r\_i,j)≦S/3$, $\Sigma\_j(r\_i,j)<S/3$ OR (2) $\Sigma\_i(r\_i,j)≦S/3$, $\Sigma\_j(r\_i,j)<S/3$, then the arbitration delay of any cell is bounded by 3(n+m)/S−1

Proof.

Consider the first time t this is violated for one or more cells in the switch. That is, at the beginning of some cell slot t there is one or more cells which were scheduled at or before the beginning of cell slot t−3(n+m)/S and which still remain at their inputs. Let c(i,j) be the cell with the earliest scheduling time of all such cells (if there are several cells with the same earliest scheduling time, we pick any of them). This cell must have been scheduled by its scheduler $S\_q$ at the beginning of cell slot t−3(n+m)/S. This is because if it were scheduled later, it would not have violated its delay bound by time t, and if it were scheduled earlier, its delay bound would have been violated before t, which would contradict the assumption that t was the first time a violation occurred. It is easy to see that there are at least S 3(n+m)/S−2=3(n+m)−2 full matching phases which occur between the beginning of cell slot t−3(n+m)/S and the beginning of cell slot t. By Lemma 1 in order for cell c(i,j) to remain at its input at time t, there must have been at least 3(n+m)−2 cells with smaller or equal timestamps than c(i,j) scheduled from i and/or to j. Clearly, no cell scheduled after time t−3(n+m)/S will have a timestamp less than or equal than t−3(n+m)/S, which is the timestamp of c(i,j). This means that in order for c(i,j) to remain at its input at time t, at time t−3(n+m)/S there must have been at least 3(n+m)−2 cells aside from c(i,j) at input i and/or destined to output j which had been scheduled by the scheduler $S\_q$ at or prior to the beginning of time t−3(n+m)/S, but were not transmitted yet by that time. By our assumption of t−3(n+m)/S being the earliest scheduling time of any cell which violated delay bound 3(n+m)−1, all cells which were scheduled prior to time t−3(n+m)/S−(3(n+m)/S−1) would have been transmitted by time t−3(n+m)/S. Therefore, the only cells which can be not yet transmitted by time t−3(n+m)/S are those which were scheduled in 3(n+m)/S cell slots t−3(n+m)/S−(3(n+m)/S−1), t−3(n+m)/S−(3(n+m)/S−2) . . . t−3(n+m)/S, which includes c(i,j) itself. By the properties of RSEFTF, each queue (i',j') can be scheduled at most $nr\_i',j'+1$ times in any tau cell slots. Therefore, there can be at most $\Sigma\_i(3(n+m)/Sr\_i,j)+n-1$ cells scheduled in the interval t−3(n+m)/S−(3(n+m)/S−1), t−3(n+m)/S) of 3(n+m)/S cells slots to output j (not counting c(i,j)). Similarly, for rates satisfying condition (1) there can be at most $\Sigma\_j(3(n+m)/Sr\_i,j)+m-1$ cells at the input i which were scheduled in this interval. Therefore, the total number of cells at time t−n which are either at input i or destined to output j which could still be at their inputs at the beginning of cell slot t−3(n+m−2)/S with time stamps less than or equal to t−3(n+m)/S, not counting c(i,j) is at most $\Sigma\_j(3(n+m)/Sr\_i,j)+\Sigma\_i(3(n+m)/Sr\_i,j)+m+n-2<2\times 3(n+m)\times S/3+m+n-2=3(m+n)-2$, falling short of the required number of 3(m+n)−2 needed to prevent c(i,j) from leaving by time t. Therefore, for any 1≦S≦3 there will not be enough cells with smaller or equal timestamps than c(i,j) to prevent c(i,j) from leaving its input before time t. QED.

What is claimed is:

1. A method of providing bandwidth and delay guarantees in an input-buffered switch with a speed-up S having input channels and output channels for transferring cells therebetween, comprising the steps of:

providing to each of the input channels per-output queues for buffering cells awaiting transfer to the output channels, each queue being associated with a respective input channel and output channel, each queue having an assigned rate and an ideal service associated therewith;

providing to each of the input channels a flow-level scheduler capable of providing bandwidth and delay guarantees to schedule cells awaiting transfer at the input channels through flow queues and assign the cells to ones of the per-output-channel queues;

providing to each input channel a rate controller for scheduling at a given cell slot the per-output-channel queues in the input channel to which it is provided, the rate controller being capable of guaranteeing to each queue an amount of actual service that is within fixed bounds from the ideal service of the queue, the fixed bounds each being equal to a value of one;

initializing state variables corresponding to the rate controller;

initializing a channel clock counter value to zero;

running each rate controller to select one of the queues as scheduled at the given cell slot;

associating with indices corresponding to the selected one of the queues timestamps equal to the current time; and for each matching phase where S is greater than or equal to two, performing arbitration processing to control transfer of the queued cells through the switch from the input channels to the output channels the step of performing arbitration processing including the steps of:

performing a maximal match computation using the associated timestamps; and indicating to each input channel the scheduled queues from which the input channel may transfer a cell;

advancing by one the channel clock counter value;

determining if the per-output queue rates have changed; and returning to the step of running each rate controller.

2. A method of providing bandwidth and delay guarantees in an input-buffered switch with a speed-up S according to claim 1, wherein the maximal match computation comprises the steps of: providing a set_match set and a set queues set, the set_match set being initialized to an empty set and the set_queue set to the set of the associated timestamps;

selecting the smallest of the associated timestamps stored in the set_queues set;

adding the selected associated timestamp to the set_match set and removing the selecting associated timestamp from the set_queues set;

deleting from the set_queues set all remaining associated timestamps associated with per-output queues corresponding to either the same input channel or output channel as the selected associated timestamp;

if the set queues set is empty, sending the indices of the queues corresponding to the timestamps in the set_match set to the input channels to which they belong; and if the set_queues set is not empty, then returning to step of selecting.

3. A method of providing bandwidth and delay guarantees in an input-buffered switch with a speed-up S according to claim 1, wherein the step of running the rate controller comprises the steps of:

for each per-output queue, maintaining the state variables to include a first and a second state variable, the first state variable corresponding to an ideal beginning time of the next cell of the per-output queue and the second state variable corresponding to an ideal finishing time of transmission of the next cell of the per-output queue;

selecting as eligible all per-output queues having an ideal beginning time which is less than or equal to the current channel clock counter value;

selecting as scheduled the eligible queue having the smallest finish time; and for the selected eligible queue, updating the first state variable with the ideal finish time and second state variable with the ideal beginning time plus one divided by the assigned rate.

4. A method of providing bandwidth and delay guarantees in an input-buffered switch with a speed-up S having input channels and output channels for transferring cells therebetween, comprising the steps of:

providing to each of the input channels per-output queues for buffering cells awaiting transfer to the output channels, each queue being associated with a respective input channel and output channel, each queue having an assigned rate limited to 50% of port bandwidth and an ideal service associated therewith;

providing to each of the input channels a flow-level scheduler capable of providing bandwidth and delay guarantees to schedule cells awaiting transfer at the input channels through flow queues and assign the cells to ones of the per-output-channel queues;

providing to each input channel a rate controller for scheduling at a given cell slot the per-output-channel queues in the input channel to which it is provided, the rate controller being capable of guaranteeing to each queue an amount of actual service that is within fixed bounds from the ideal service of the queue, the fixed bounds each being equal to a value of one;

initializing state variables corresponding to the rate controller;

initializing a channel clock counter value to zero;

running each rate controller to select one of the queues as scheduled at the given cell slot;

associating with indices corresponding to the selected one of the queues timestamps equal to the current time; and for each matching phase where S is greater than or equal to one but less than two, performing arbitration processing to control transfer of the queued cells through the switch from the input channels to the output channels, the step of performing arbitration processing including the steps of:

performing a maximal match computation using the associated timestamps; and indicating to each input channel the scheduled queues from which the input channel may transfer a cell;

advancing by one the channel clock counter value;

determining if the per-output queue rates have changed; and returning to the step of running each rate controller.

5. A method of providing bandwidth and delay guarantees in an input-buffered switch with a speed-up S according to claim 4, wherein the maximal match computation comprises the steps of:

providing a set_match set and a set_queues set, the set_match set being initialized to an empty set and the set_queue set to the set of the associated timestamps;

selecting the smallest of the associated timestamps stored in the set_queues set;

adding the selected associated timestamp to the set_match set and removing the selecting associated timestamp from the set_queues set;

deleting from the set_queues set all remaining associated timestamps associated with per-output queues corresponding to either the same input channel or output channel as the selected associated timestamp;

if the set queues set is empty, sending the indices of the queues corresponding to the timestamps in the set_match set to the input channels to which they belong; and if the set_queues set is not empty, then returning to step of selecting.

6. A method of providing bandwidth and delay guarantees in an input-buffered switch with a speed-up S according to claim 4, wherein the step of running the rate controller comprises the steps of:

for each per-output queue, maintaining the state variables to include a first and a second the state variable, the first state variable corresponding to an ideal beginning time of the next cell of the per-output queue and the second state variable corresponding to an ideal finishing time of transmission of the next cell of the per-output queue;

selecting as eligible all per-output queues having an ideal beginning time which is less than or equal to the current channel clock counter value;

selecting as scheduled the eligible queue having the smallest finish time; and for the selected eligible queue, updating the first state variable with the ideal finish time and second state variable with the ideal beginning time plus one divided by the assigned rate.

7. A apparatus for providing bandwidth and delay guarantees in an input-buffered switch with a speed-up S, the input-buffered switch having input channels and output channels for transferring cells therebetween, the apparatus comprising:

per-output-channel queues in each of the input channels for buffering cells awaiting transfer to the output channels, each per-output-channel queue corresponding to a respective input channel and output channel, and having an assigned rate and an ideal service associated therewith;

a flow-level scheduler in each of the input channels capable of providing bandwidth and delay guarantees for scheduling cells awaiting transfer at the input channels through flow queues and assigning the cells to ones of the per-output-channel queues;

a rate controller corresponding to each input channel for scheduling for a given cell slot the per-output-channel queues in the input channel to which it corresponds, the rate controller being defined to guarantee to each queue an amount of actual service that is within fixed bounds from the ideal service of the queue, the fixed bounds being equal to a value of one; and an arbiter, responsive to the scheduling of queues by each rate controller, for controlling the processing of the queued cells through the switch from the input channels to the output channels at a speedup S equal to a number of phases per cell slot, where S is greater than or equal to two, the arbiter using a maximal match computation to choose one of the scheduled queues from which a cell may be transmitted in each phase.

8. A apparatus for providing bandwidth and delay guarantees in an input-buffered switch with speed-up according to claim 7, wherein the rate controller is located in the arbiter.

9. An apparatus for providing bandwidth and delay guarantees in an input-buffered switch with speed-up according to claim 7, wherein the rate controller is located in the input channel to which it corresponds.

10. An apparatus for providing bandwidth and delay guarantees in an input-buffered switch with speed-up according to claim 7, where S is greater than or equal to one but less than two with a load due to guaranteed flows limited to 50% of port bandwidth.

* * * * *